Nov. 24, 1925.
Ö. RAVNER
PROCESS AND APPARATUS FOR CONDENSING ZINC VAPOR
Filed March 7, 1921
1,562,473
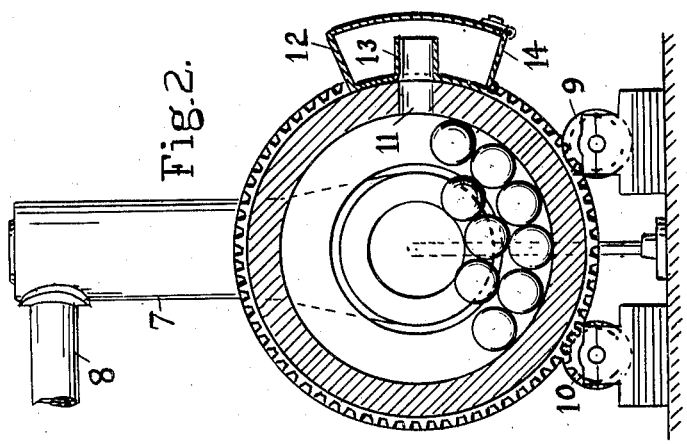
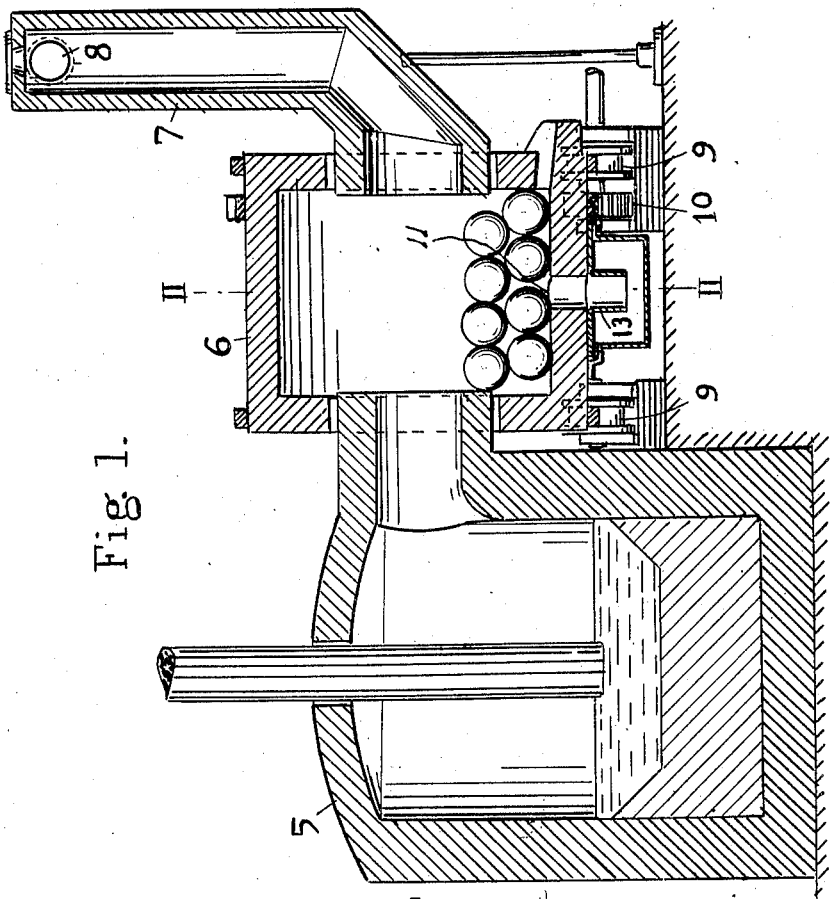
Inventor, Öystein Ravner,
By  Attorneys.

Patented Nov. 24, 1925.

1,562,473

UNITED STATES PATENT OFFICE.

ÖYSTEIN RAVNER, OF CHRISTIANIA, NORWAY, ASSIGNOR TO DET NORSKE AKTIESELSKAB FOR ELEKTROKEMISK INDUSTRI, OF CHRISTIANIA, NORWAY, A BUSINESS ENTITY.

PROCESS AND APPARATUS FOR CONDENSING ZINC VAPOR.

Application filed March 7, 1921. Serial No. 450,121.

*To all whom it may concern:*

Be it known that I, ÖYSTEIN RAVNER, a subject of the King of Norway, and a resident of Christiania, Kingdom of Norway, have invented certain new and useful Improvements in Processes and Apparatus for Condensing Zinc Vapor, of which the following is a specification.

This invention relates to the condensing of zinc vapors, and the object of the invention is a process, whereby condensation of such vapors is effected without any considerable formation of the so-called zinc dust or powder.

According to my present invention I employ a condensation system consisting of first a movable part and second a stationary part. The movable part is generally directly connected with the upper part of an electric zinc furnace, and preferably consists of a revolving drum, which has a comparatively large diameter, thus affording a low speed for the gases and giving the liquid and solid particles which have separated out an opportunity of settling. The drum having a comparatively large diameter will be cooled to a marked extent during rotation, but if necessary I may provide additional cooling by blowing air against the drum or supplying water cooling. If on account of the size of the drum as compared with the furnace it should be necessary to heat the drum, an electric arc may be arranged therein for this purpose whereby it will be possible to maintain the temperature at the desired elevation. When the furnace gases enter the drum, they strike the comparatively cool top thereof because of their buoyancy and are thus subjected to almost instantaneous cooling to about 700° C. This cooling effect is continued by reason of the rotation of the drum. Further the rotation of the drum causes a rapid and intimate mixing of the comparatively large quantity of gas which is present in the drum in a relatively cool condition and the comparatively small amounts of hot gases entering from the furnace, whereby the cooling of the latter is greatly accelerated. During the rotation of the drum its walls will continuously be freed from possibly sintered dust on account of the friction against the powder present in the drum.

The formation of dust, however, will be comparatively small as the principal amount of the zinc vapors are condensed in the form of liquid zinc, which collects at the bottom of the drum together with the zinc dust. On account of the rotation of the drum, the zinc dust is readily reduced to liquid zinc especially if rollers are placed in the drum.

The non-condensable gases pass through the drum into the stationary part of the condensing system, consisting of an inclined tube in which the remainder of the zinc vapor is condensed. The condensed product on account of the angle of the tube will automatically fall back into the drum, and thus be subjected to the same mechanical treatment as the previously condensed product. The gases which have been completely freed from zinc vapors are led out through an opening in the inclined tube.

By employing a condensation system as described above I obtain considerable advantage. Because the gases in the revolving drum are rapidly cooled down to 700° C. or lower, the formation of dust is reduced without causing the walls to become covered with a poorly heat conductive layer of dust, as is the case in the usual stationary condensation channels.

Furthermore the use of a stationary inclined tube directly connected with the drum means a great advantage in making it possible to have a comparatively small drum, as the final condensation will take place in the stationary part, and the condensate will fall back into the drum and will be treated there in the same way as the condensate originally formed therein.

As is apparent from the above remarks the drum serves two purposes, first the cooling of the furnace gases and second the subsequent mechanical treatment of the zinc dust which has separated out in the drum itself as well as in the stationary inclined tube connected therewith.

I have found that great advantage may be obtained by a cretain method of working. Only a slow movement of the drum is required for cooling the gases. The drum may therefore be saved from unnecessary wear by rotating comparatively slowly until a suitable amount of the dust has separated out and then increasing its speed of rotation during a comparatively short period for subjecting the dust to mechanical movement. After each such stirring the liquid zinc may be removed by tapping in known manner after stopping the drum.

Instead of removing the zinc dust in the usual manner I have found that this may advantageously be done through an opening in the wall of the drum during its rotation. To avoid admission of air during this operation it is preferable to enclose the opening with a dust box or other dust collector. This may suitably be so constructed and arranged that the dust will fall into the box in the lowest position thereof and cannot fall back into the drum during rotation.

I have illustrated my invention in the drawing forming part of this application.

Fig. 1 shows a section through a zinc furnace with adjoining condenser, and Fig. 2 shows a section through the revolving drum taken at the line II—II of Fig. 1.

A revolving drum 6 is directly and rotatably connected with an electric zinc furnace 5 of ordinary type on the one side and on the other with an inclined stationary tube 7 provided with an opening 8 through which the non-condensable gases may escape. The revolving drum is supported on the rollers 9 and gets its rotating movement by means of the gear 10. The wall of the drum is provided with an opening 11, which is generally closed with a stopper. When the zinc dust is to be removed from the drum, the dust box 12 is placed outside the opening 11. The dust box carries a tube 13, which when the box is in place forms a direct continuation of the opening 11. Through this tube the zinc dust falls into the box 12 when this is in its lowest position. During the upward movement of the box the zinc dust falls into one side thereof, and is thus prevented from falling back into the drum. The box is provided with an opening having a cover 14 through which the zinc dust may be emptied.

The above specific illustration of my invention has been given for clearness of understanding only, and shall mean no limitation of my invention, but the appended claims should be construed as broadly as permissible in view of the prior art.

What I claim as new and desire to secure by Letters Patent of the United States is:

1. A condenser for zinc vapors comprising a revolving drum and a stationary tube connected with the drum in such manner that the condensate formed in the tube will automatically fall back into the drum.

2. A condenser for zinc vapors comprising a revolving drum directly connected with a zinc furnace and a stationary tube connected with said drum in such manner that the condensate formed in the tube will automatically fall back into the drum.

3. A condenser for zinc vapors comprising a revolving drum directly connected with a zinc furnace and a stationary tube connected with said drum in such manner that the condensate formed in the tube will automatically fall back into the drum, said drum having an opening in its wall and means enabling removal of dust therethrough during the rotation of the drum.

4. A condenser for zinc vapors comprising a revolving drum directly connected with a zinc furnace and a stationary tube connected with said drum in such manner that the condensate formed in the tube will automatically fall back into the drum, said drum having an opening in its wall for removing dust during the rotation of the drum and a dustbox outside said opening.

5. The process of condensing zinc vapor which consists in leading zinc vapor into a condenser comprising a revolving drum and a stationary tube connected therewith and causing the drum to rotate first at a comparatively low speed, and then increasing the speed for a comparatively short time, thus subjecting the zinc dust formed to a strong mechanical treatment.

Signed at Christiania, Norway, this 16 day of February, 1921.

ÖYSTEIN RAVNER.